(12) United States Patent
Scarth et al.

(10) Patent No.: US 9,566,838 B2
(45) Date of Patent: Feb. 14, 2017

(54) FAIL-SAFE LATCH MECHANISM

(71) Applicants: Ian Scarth, King City (CA); Shawn Dawson, Bowmanville (CA)

(72) Inventors: Ian Scarth, King City (CA); Shawn Dawson, Bowmanville (CA)

( * ) Notice: Subject to any disclaimer, the term of this patent is extended or adjusted under 35 U.S.C. 154(b) by 158 days.

(21) Appl. No.: 14/274,179

(22) Filed: May 9, 2014

(65) Prior Publication Data

US 2015/0321526 A1 Nov. 12, 2015

(51) Int. Cl.
*B60D 1/28* (2006.01)
*B60D 1/48* (2006.01)
*B60D 1/00* (2006.01)

(52) U.S. Cl.
CPC ............ *B60D 1/481* (2013.01); *B60D 1/28* (2013.01); *B60D 2001/005* (2013.01)

(58) Field of Classification Search
CPC .................................. B60D 1/04; B60D 1/28
USPC ........................................................ 280/514
See application file for complete search history.

(56) References Cited

U.S. PATENT DOCUMENTS

| | | | | | |
|---|---|---|---|---|---|
| 744,875 | A | * | 11/1903 | Neumeier | B60D 1/04 280/510 |
| 827,431 | A | * | 7/1906 | Evensen | B60D 1/36 280/477 |
| 945,683 | A | * | 1/1910 | Beydler | B60D 1/04 280/504 |
| 1,813,075 | A | * | 7/1931 | Neufang | B60D 1/04 280/453 |
| 1,824,843 | A | * | 9/1931 | Staley | B60D 1/04 280/504 |
| 1,848,956 | A | * | 3/1932 | Koehler | B60D 1/04 213/191 |
| 1,860,973 | A | * | 5/1932 | Yeakel | B60D 1/04 280/498 |
| 1,870,606 | A | * | 8/1932 | Contois | B60D 1/04 213/211 |
| 1,871,841 | A | * | 8/1932 | Contois | B60D 1/04 280/498 |
| 1,874,147 | A | * | 8/1932 | Williams | B60D 1/04 280/498 |
| 1,885,079 | A | * | 10/1932 | Chase | B60D 1/04 213/181 |
| 2,072,239 | A | * | 3/1937 | Zeindler | B60D 1/04 280/509 |
| 2,129,745 | A | * | 9/1938 | Scammell | B60D 1/04 280/477 |
| 2,153,309 | A | * | 4/1939 | Milz | B60D 1/04 280/492 |

(Continued)

*Primary Examiner* — Joseph Rocca
*Assistant Examiner* — Conan Duda
(74) *Attorney, Agent, or Firm* — Bennett Jones LLP (57) ABSTRACT

A latch and fail-safe mechanism suitable for use with an industrial cart, dolly, trailer or other types mobile platforms or carriers. According to an embodiment, the latch comprises a housing or enclosure, a latch mechanism, a hitch hook and a fail-safe mechanism. The housing includes a back-plate configured to attach the latch to a mounting bracket or frame plate on the cart. The latch mechanism is operatively coupled to the hitch hook and configured to bias the hitch hook in a closed or engaging position. The fail-safe mechanism is operatively coupled to the hitch hook and configured to bias and maintain the hitch hook in the closed position in the event of failure of the latch mechanism.

8 Claims, 9 Drawing Sheets

(56) References Cited

U.S. PATENT DOCUMENTS

| | | | | |
|---|---|---|---|---|
| 2,200,654 A * | 5/1940 | Ruhl | B60D 1/04 | 280/510 |
| 2,426,099 A * | 8/1947 | Hershowitz | B60D 1/04 | 24/598.5 |
| 2,491,143 A * | 12/1949 | Weiss | B60D 1/04 | 24/599.7 |
| 2,597,096 A * | 5/1952 | Harris | B60D 1/04 | 24/599.7 |
| 2,918,311 A * | 12/1959 | Karnath | B60D 1/04 | 280/510 |
| 2,951,711 A * | 9/1960 | Karnath | B60D 1/04 | 280/508 |
| 3,204,985 A * | 9/1965 | Karnath | B60D 1/04 | 280/504 |
| 3,259,418 A * | 7/1966 | Munday | B60D 1/04 | 294/82.27 |
| 3,572,789 A * | 3/1971 | McClintock | E05B 65/0817 | 292/114 |
| 4,225,149 A * | 9/1980 | Koopman | B60D 1/26 | 280/477 |
| 4,463,965 A * | 8/1984 | Lawson | B60P 3/1033 | 280/414.1 |
| 4,492,386 A * | 1/1985 | Roberts | B60D 1/04 | 24/600.1 |
| 4,958,848 A * | 9/1990 | Nash | B60D 1/04 | 280/504 |
| 5,713,691 A * | 2/1998 | Solberg | B60D 1/04 | 172/677 |
| 5,967,541 A * | 10/1999 | Johansen | B60D 1/04 | 180/904 |
| 6,099,017 A * | 8/2000 | Schooler | B60D 1/04 | 280/510 |
| 6,318,746 B1 * | 11/2001 | McCrory | B62D 53/00 | 280/411.1 |
| 6,382,657 B1 * | 5/2002 | Lynn | B60D 1/065 | 280/457 |
| 6,394,481 B1 * | 5/2002 | Pinlam | B60D 1/04 | 280/437 |
| 7,011,330 B2 * | 3/2006 | Blanton | B60D 1/26 | 280/510 |
| 8,393,631 B1 * | 3/2013 | Sybert | B60D 1/02 | 280/508 |
| 2008/0111329 A1 * | 5/2008 | Brown | B60D 1/00 | 280/33.997 |
| 2010/0025964 A1 * | 2/2010 | Fisk | B62D 13/04 | 280/444 |
| 2011/0017530 A1 * | 1/2011 | Keski-Luopa | B60D 1/04 | 180/65.1 |
| 2011/0316254 A1 * | 12/2011 | Bui | B60D 1/28 | 280/477 |
| 2015/0217610 A1 * | 8/2015 | Olson | B60D 1/04 | 280/507 |

\* cited by examiner

FAIL-SAFE LATCH MECHANISM

FIELD OF THE INVENTION

The present invention relates to industrial carts and the like, and more particularly to a fail-safe latch mechanism for coupling together one or more industrial carts.

BACKGROUND OF THE INVENTION

In the art, industrial carts are widely known and used for material and parts handling. In the automotive industry, for example, industrial carts are utilized to deliver parts and other materials to automated assembly lines and other areas of the physical plant. The industrial carts are typically coupled together to form a train of two or more carts for material delivery and handling.

The industrial carts are coupled together with a latch mechanism. In order to facilitate material delivery and handling efficiency, the latch or coupling mechanism is configured to be releasable without the need for special tools and the like. Typical latch mechanisms include a spring mechanism that is configured to bias the latch mechanism into a closed or engaged position.

It will, however, be appreciated that over time the spring will weaken and as result the latch mechanism will be more susceptible to accidental opening or complete failure. The accidental opening or failure of the latch mechanism can, in turn, lead to a runaway cart or other unintended movement or displacement. Since the industrial cart can be carrying heavy loads, a runaway condition presents a serious safety concern or industrial hazard.

Accordingly, there remains a need for improvements in the art.

BRIEF SUMMARY OF THE INVENTION

The present invention is directed to a latch with a fail-safe mechanism and is suitable for use with industrial carts, dollies and other types of industrial vehicles or other mobile material delivery and handling systems.

According to one embodiment, the present invention comprises a latch suitable for use with an industrial cart, the latch comprises, a support structure configured to be connected to the industrial cart; a hitch hook operatively coupled to the support structure and configured to move between a closed position and an open position; a latch mechanism coupled to the hitch hook and configured to bias the hitch hook to said closed position; and a fail-safe mechanism coupled to the hitch hook and configured to bias the hitch hook in the closed position and maintain the hitch hook in the closed position during a failure of the latch mechanism.

According to another embodiment, the present invention comprises a fail-safe latch for use with an industrial cart, the fail-safe latch comprises: a housing and including a back plate configured to be connected to the industrial cart; a latch mechanism including a shaft and first and second spring positioning plates, the first and second spring positioning plates being attached to the back plate in a spaced arrangement, and further including first and second hitch hook side plates, the first and second hitch hook side plates being attached to the back plate between the first and the second spring positioning plates and configured to form a hitch hook channel, and each of the first and the second spring positioning plates including a spring plate positioning hole, and each of the first and the second hitch hook plates including a hitch hook plate hole, and the spring positioning plate holes being on center with the hitch hook side plates and configured to support the shaft; a hitch hook having a hole for receiving the shaft, and the hitch hook being pivotally mounted on the shaft and in the hitch hook channel, and including a hook end configured to engage a latch ring, and a pivot end; the latch mechanism further including a foot plate, and the foot plate being connected to the hitch hook, and the foot plate including first and second spring retainer; the latch mechanism further including first and second springs, and each of the spring positioning plates including a spring tab, the first spring being mounted on a section of the shaft between the first spring positioning plate and the first hitch side plate and having one end secured by the spring tab, and the second spring being mounted on a section of the shaft between the second spring positioning plate and the second hitch side plate and having one end secured by the spring tab, and the first spring having another end secured by the first spring retainer on the foot plate and the spring being mounted on the shaft under tension to bias the foot plate and the hitch hook into a latch closed position, and the second spring having another end secured by the second spring retainer on the foot plate and the second spring being mounted on the shaft under tension to bias the foot plate and the hitch hook into the latch closed position; and a counter weight, the counter weight being attached to the pivot end of the hitch hook, and configured to generate a force to bias the hitch hook and the foot plate into the latch closed position.

According to a further embodiment, the present invention comprises an industrial cart comprising, a frame; a carrier coupled to the frame and configured to carry a load; a plurality of wheels operatively coupled to the frame; the frame including a mounting plate; and a fail-safe latch comprising, a housing and including a back plate configured to be connected to the mounting plate; a latch mechanism including a shaft and first and second spring positioning plates, the first and second spring positioning plates being attached to the back plate in a spaced arrangement, and further including first and second hitch hook side plates, the first and second hitch hook side plates being attached to the back plate between the first and the second spring positioning plates and configured to form a hitch hook channel, and each of the first and the second spring positioning plates including a spring plate positioning hole, and each of the first and the second hitch hook plates including a hitch hook plate hole, and the spring positioning plate holes being on center with the hitch hook side plates and configured to support the shaft; a hitch hook having a hole for receiving the shaft, and the hitch hook being pivotally mounted on the shaft and in the hitch hook channel, and including a hook end configured to engage a latch ring, and a pivot end; the latch mechanism further including a foot plate, and the foot plate being connected to the hitch hook, and the foot plate including first and second spring retainer; the latch mechanism further including first and second springs, and each of the spring positioning plates including a spring tab, the first spring being mounted on a section of the shaft between the first spring positioning plate and the first hitch side plate and having one end secured by the spring tab, and the second spring being mounted on a section of the shaft between the second spring positioning plate and the second hitch side plate and having one end secured by the spring tab, and the first spring having another end secured by the first spring retainer on the foot plate and the spring being mounted on the shaft under tension to bias the foot plate and the hitch hook into a latch closed position, and the second spring having another end secured by the second spring retainer on the foot plate and the second spring being mounted on the shaft under tension to bias the foot plate and the hitch hook into the latch closed position; and a counter weight, the counter weight being attached to the pivot end of the hitch hook, and configured to generate a force to bias the hitch hook and the foot plate into the latch closed position.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which.

Like reference numerals indicate like or corresponding elements or components in the drawings.

DETAILED DESCRIPTION OF THE EMBODIMENTS OF THE INVENTION

Figure 1A:
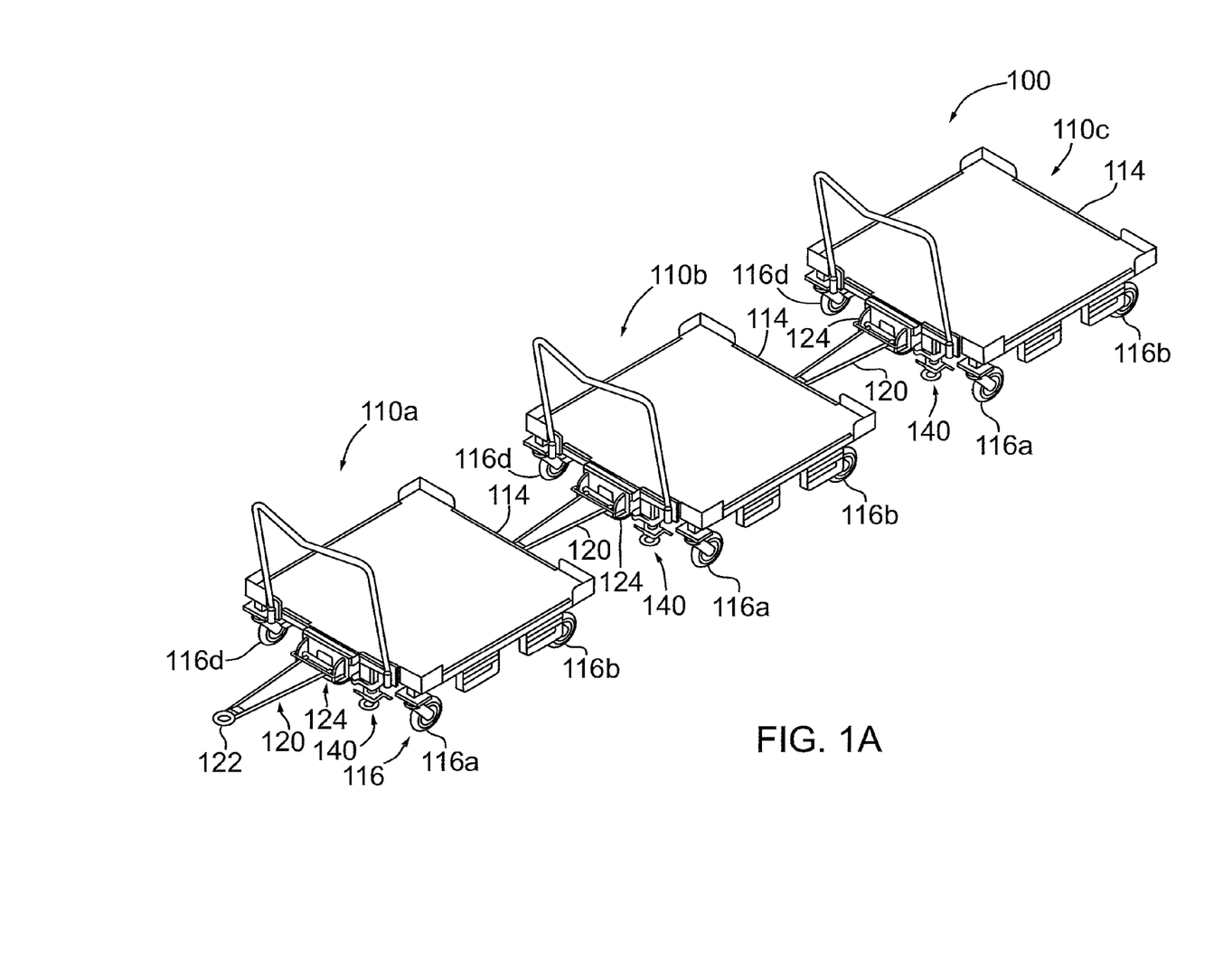
FIG. 1A shows in diagrammatic form a plurality of industrial carts each configured with a latch and fail-safe mechanism according to an embodiment of the present invention and coupled together to form an industrial material delivery train.
Figure 1B:
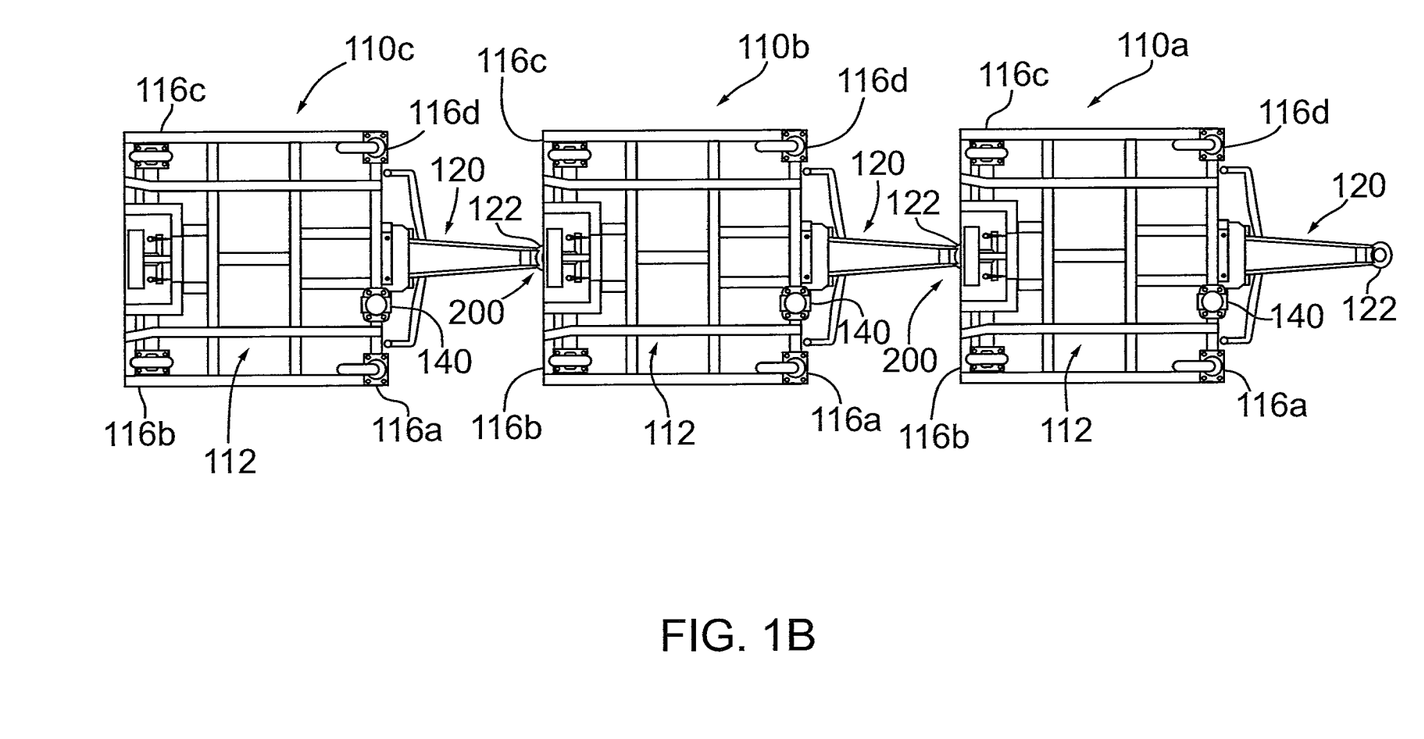
FIG. 1B is a bottom plan view of the industrial carts of FIG. 1A showing the underbody or under carriage configuration of the carts.
Figure 1C:
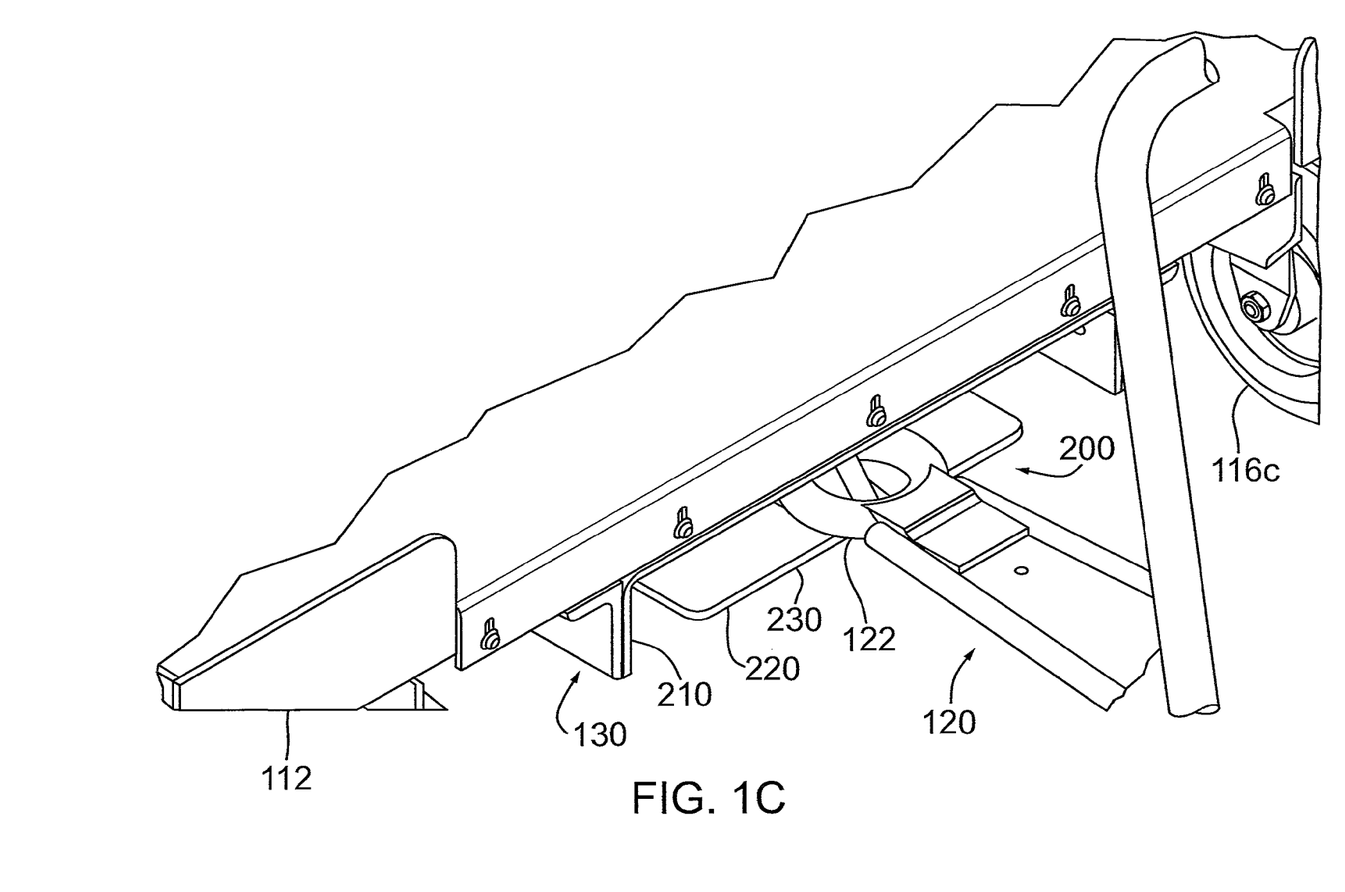
FIG. 1C shows in diagrammatic form two of the carts of FIG. 1A coupled together with the latch and fail-safe mechanism according to an embodiment of the present invention.
Figure 1D:
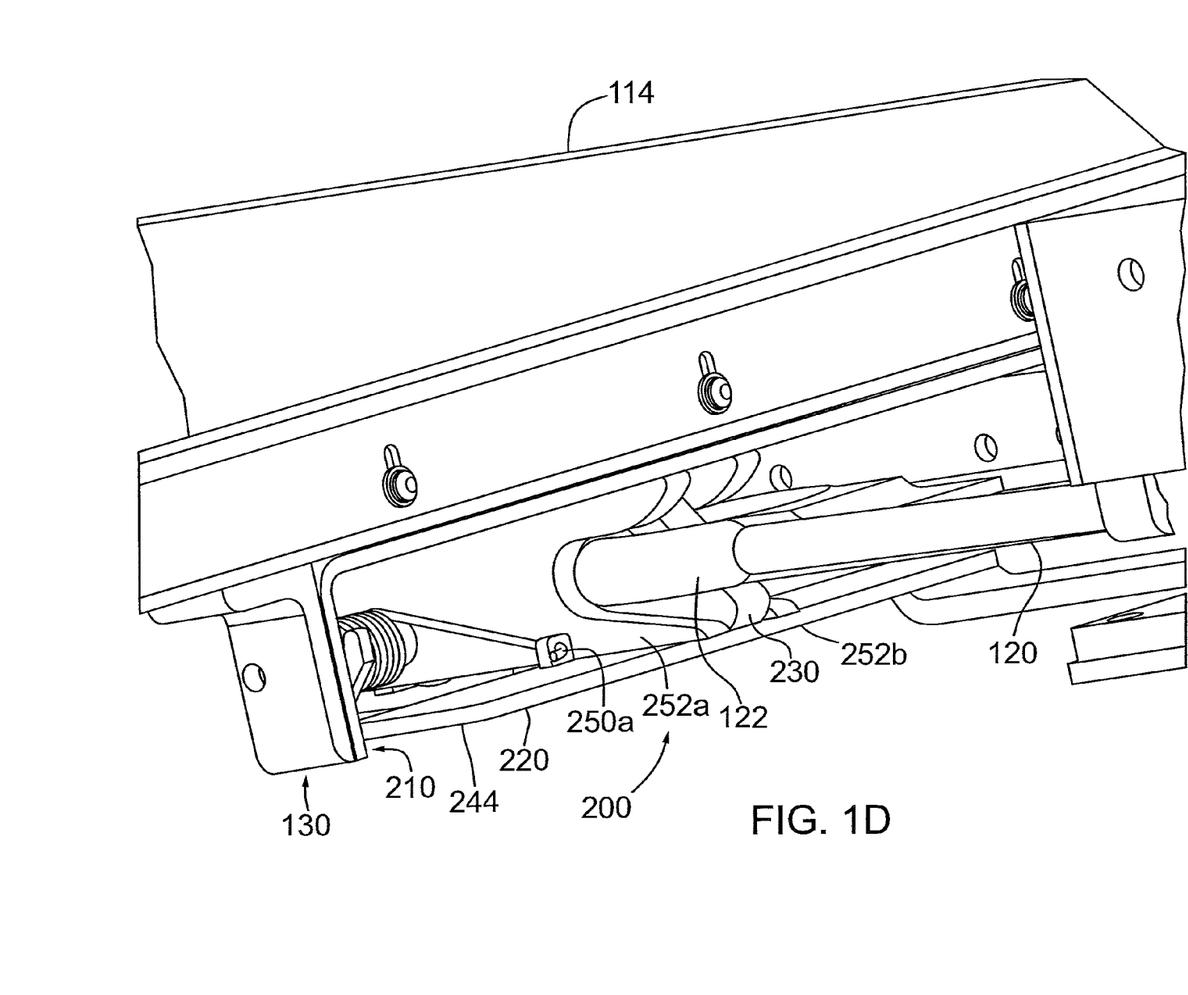
FIG. 1D shows in diagrammatic form another view of the latch and fail-safe mechanism according to an embodiment of the present invention for coupling together two carts as depicted in FIG. 1A.

Reference is made to FIG. 1A, which shows in diagrammatic form an exemplary operating environment and configuration for implementing and practising a latch and fail-safe mechanism according to embodiments of the present invention. The operating environment according to an embodiment and indicated generally by reference 100 comprises a plurality of industrial carts 110, indicated individually by references 110a, 110b, ... 110n with each of the carts 110 being configured with a latch and fail-safe mechanism according to the present invention and indicated generally by reference 200. The industrial carts 110 may comprise a conventional or known cart, dolly, trailer or the like, and will typically comprise a base frame or support structure 112 (as also shown in FIGS. 1B and 1C), and a platform or cargo bed or carrier surface 114, a wheel structure or assembly, indicated generally by reference 116. The wheel assembly 116 is coupled to the frame 112 and according to an exemplary implementation comprises a four wheel configuration, with the wheels indicated individually by references 116a, 116b, 116c and 116d. According an exemplary implementation, two of the wheels 116a and 116d (e.g. the front wheels) are configured to be rotatable, for example, for steering or turning the cart(s) 110. The platform 114 is configured to carry the load or material, e.g. automotive parts and components, or palletized loads. As shown in FIG. 1, the fail-safe latch 200 is connected or installed on one end of the cart 110. According to an exemplary implementation, the cart 110 includes a mounting bracket 130 as shown in FIG. 1C and FIG. 1D for mounting or attaching the fail-safe latch 200 to the cart 110, for example, the rear end of the cart 110. The fail-safe latch 200 may also be connected directly to the frame 112 of the cart 110. The other end of the cart 110, for example, the front end of the cart 110, includes an arm 120 (e.g. a pintel arm) with a latch ring or ring 122 (e.g. a pintel ring) which is compatible with and configured for engaging a hitch hook in the fail-safe latch 200, as shown in FIG. 1C and FIG. 1D, and described in detail below. According to an exemplary implementation, the cart 110 includes a hinge mechanism 124 (as shown in FIG. 1A) for connecting the pintel arm 120 (and latch ring 122) to the cart 110 and allowing the arm 120 to pivot or swing up and down via the hinge mechanism 124. According to another as aspect, the carts 110 may include a stop mechanism indicated generally by reference 140. The stop mechanism 140 is configured when actuated to maintain or hold the cart 110 in a stationary position.

In the following description, the terms latch and fail-safe mechanism and fail-safe latch are used interchangeably. While embodiments according to the present invention are described in the context of industrial and manufacturing applications, it will be appreciated that the embodiments have wider application to other fields, for example, baggage and freight delivery trailers or carts or trains typically utilized, for example, at airports, for the loading and unloading of airline luggage and/or freight.

Figure 2:
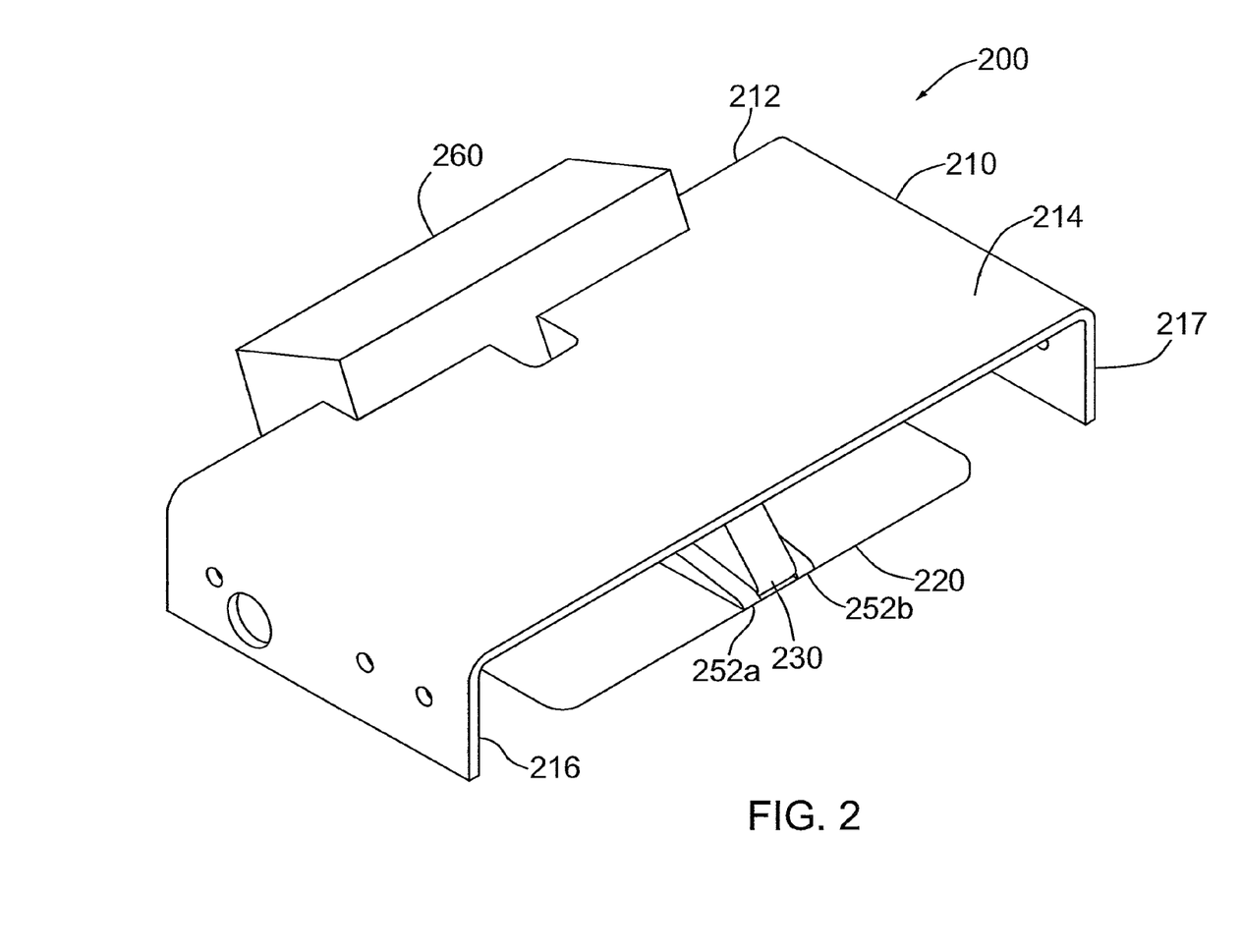
FIG. 2 is an isometric view of a latch and fail-safe mechanism according to an embodiment of the present invention.
Figure 3:
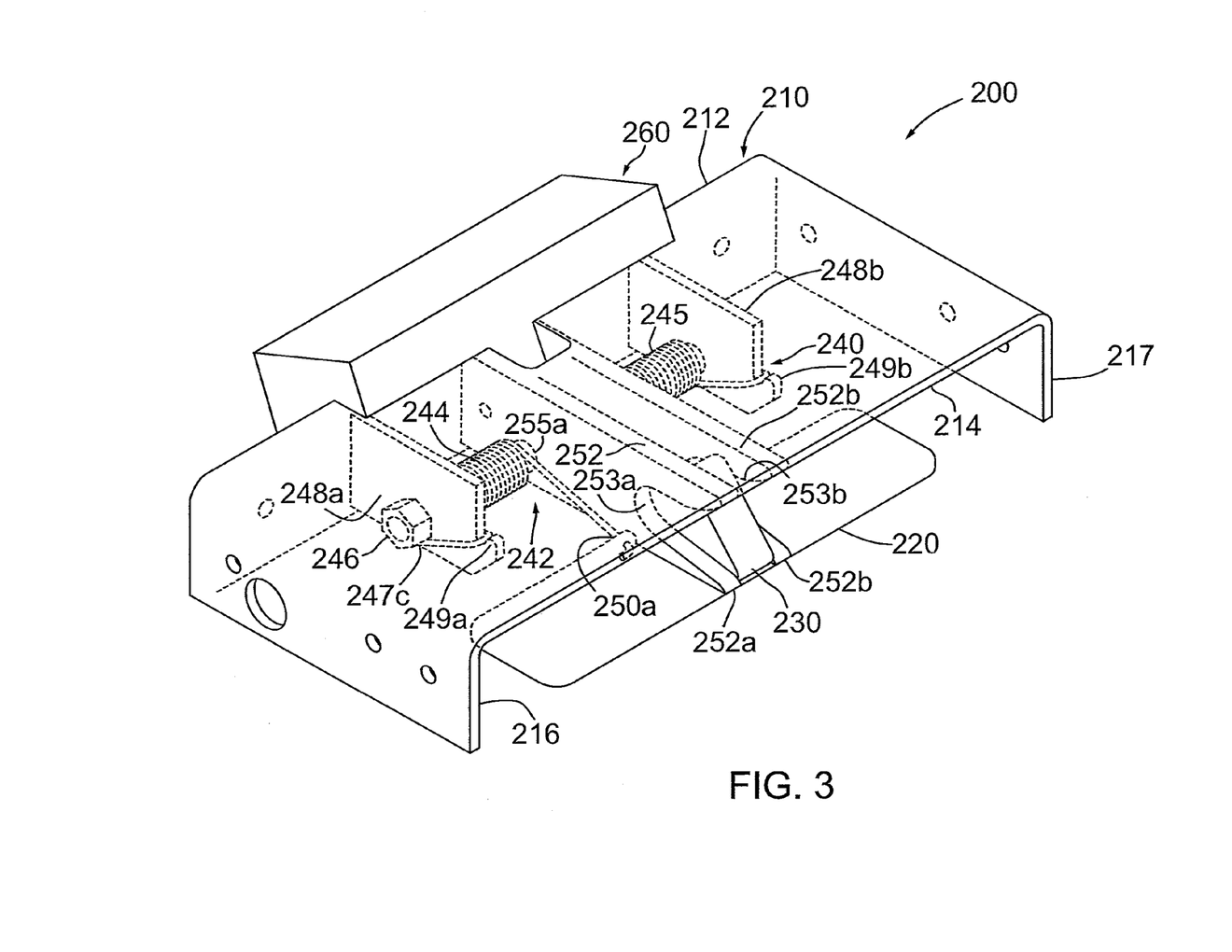
FIG. 3 is an isometric view of the latch and fail-safe mechanism of FIG. 2 with the housing depicted in dotted-chain outline.
Figure 4:
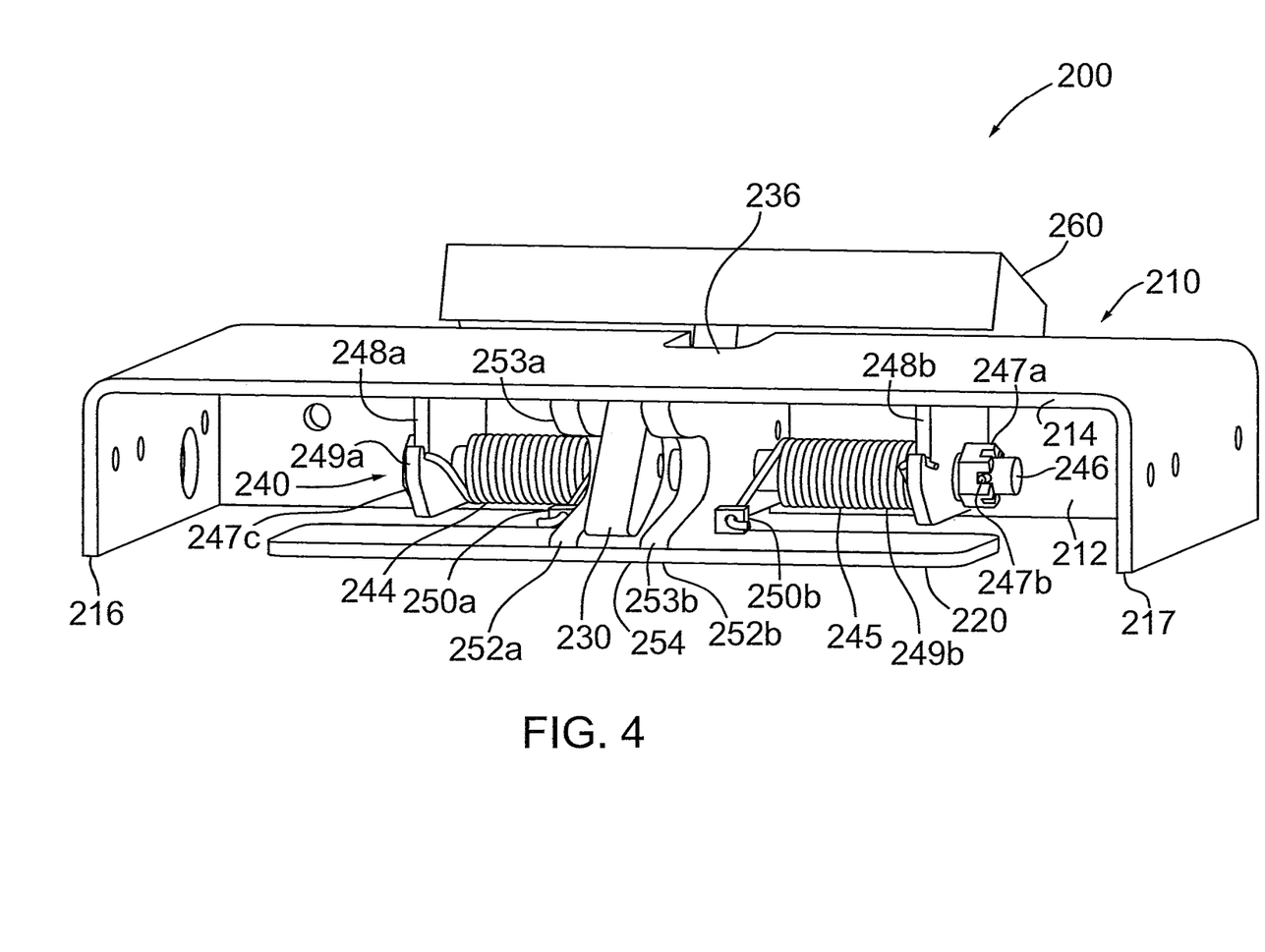
FIG. 4 is a front isometric view of the latch and fail-safe mechanism of FIG. 2.

Reference is next made to FIGS. 2 to 4, which show a latch with a fail-safe mechanism according to an embodiment of the present invention and indicated generally by reference 200. The latch with a fail-safe mechanism 200 comprises a housing or enclosure indicated generally by reference 210, a hook foot plate or pedal 220, a hitch hook 230, a latch mechanism indicated generally by reference 240 in FIGS. 3 and 4, and a fail-safe mechanism indicated generally by reference 260.

As shown in FIG. 2, the latch housing 210 forms a support structure for the hook hitch 230 and the latch mechanism 240. The latch housing 210 is also configured to attach or connect to the cart or dolly, for example, bolted to the frame 112 and/or a mounting plate or bracket 130 on the cart 110 (for example, as shown in FIGS. 1C and 1D). According to an embodiment, the latch housing 210 comprises a back or rear plate 212, a top plate 214 and respective side plates indicated by references 216 and 217. According to an exemplary implementation, the latch housing 210 is fabricated using individual steel plates that are welded together to form the housing utilizing known techniques.

Figure 8:
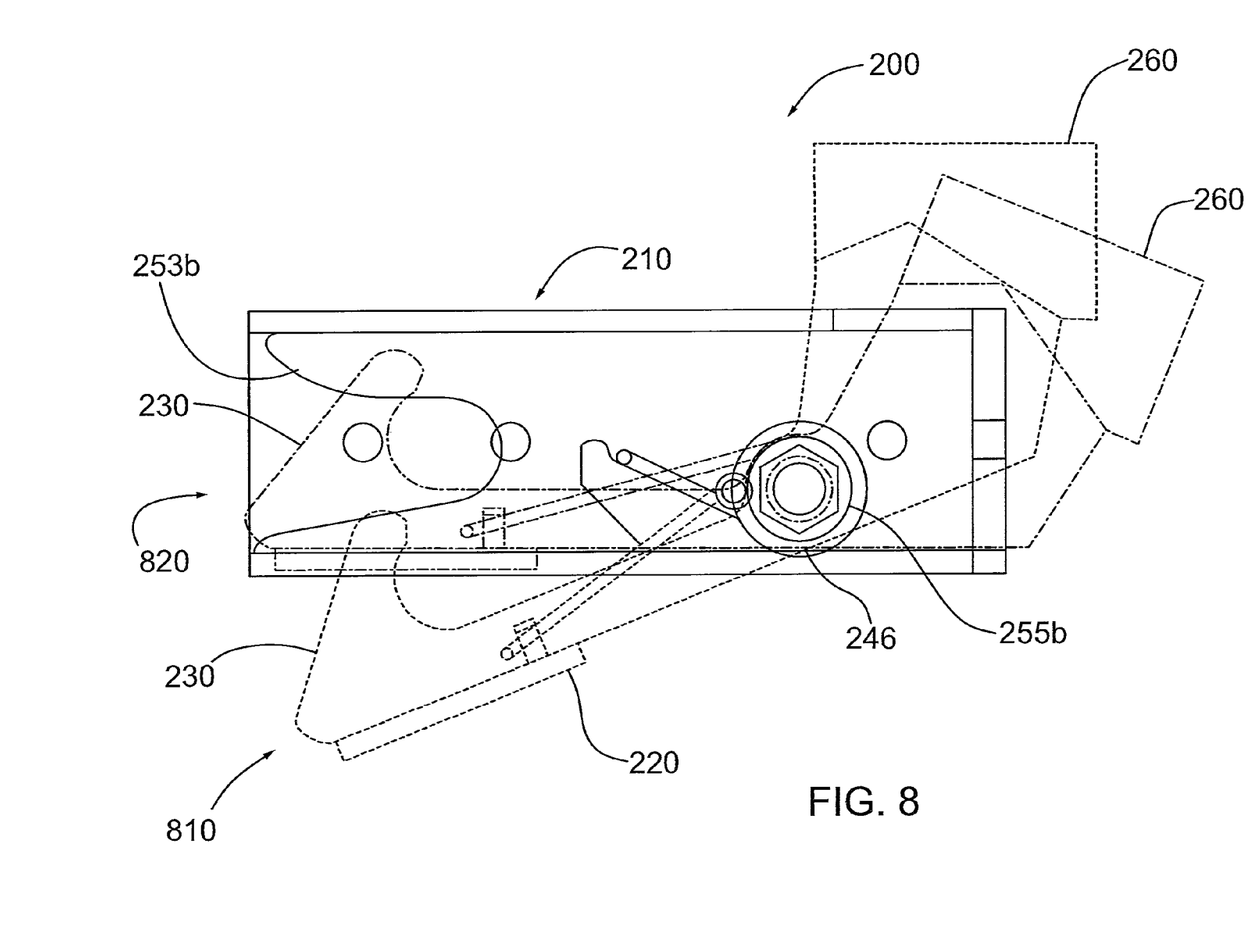
FIG. 8 is a side view of the fail-safe latch mechanism moving between a closed (i.e. engaged) position to an open (i.e. disengaged) position.

The hook foot plate or pedal 220 is configured to be responsive to a downward applied force and actuate the latch mechanism 240 and move the hitch hook 230 into an open or disengaging position (for example, as indicated by reference 810 in FIG. 8). The downward force can be foot pressure applied by an operator or technician.

Figure 6:
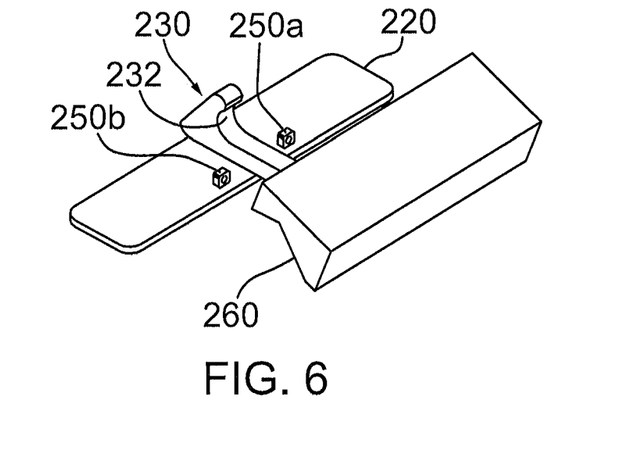
FIG. 6 is an isometric of the hitch hook member together with the counter weight.

The latch mechanism 240 is configured to maintain or hold the hitch hook 230 (and the hook foot plate 220) in a closed or engaging position, for example, as indicated by reference 820 in FIG. 8 and also illustrated in FIGS. 1C and 1D. As shown in FIG. 3, the latch mechanism 240 comprises a bias mechanism indicated generally by reference 242, which is configured to bias or retain the hitch hook 230 in the closed position, for example, as depicted in FIG. 3, and also in FIG. 8 (i.e. indicated by reference 820) and FIGS. 1C and 1D. According to an embodiment, the bias mechanism 242 comprises a spring 244, which is mounted on a shaft 246. Each end of the shaft 246 is held in place or supported by respective spring positioning plates 248a and 248b as shown in FIG. 3. The spring positioning plates 248a and 248b are affixed or connected to the inside of the back plate 212 for the latch housing 210, for example, using welding or other known assembly or connection techniques. As shown in FIG. 4, the shaft 246 is secured in place using a suitable fastener, for example, a hex slotted nut 247a and a slotted pin 247b at one end of the shaft, and another hex nut 247c, which is welded or otherwise securely affixed to the other end of the shaft 246. Referring back to FIG. 3, the spring positioning plate 248a includes a spring tab 249a for engaging one end of the spring 244. The other end of the spring 244 is engaged or secured by a spring retainer 250a which is affixed or formed on the hook foot plate 220 as shown in FIGS. 1D, 3 and 6. The spring 244 is secured in tension to provide a force that acts to bias or force the hook foot plate 220 upward, i.e. into the closed position 820 as shown in FIG. 8 and also in FIGS. 1C, 1D and FIG. 3.

According to another embodiment and as shown in FIG. 3, the latch mechanism 240 comprises a second spring 245. The configuration of two springs 244 and 245 provides a degree of redundancy should the first spring 244 (or the second spring 245) fail. As shown in FIG. 3, the spring positioning plate 248b includes a spring tab 249b for engaging one end of the second spring 245, and the other end of the spring 245 is secured by a spring retainer 250b on the hook foot plate 220 as shown in FIG. 3 and also in FIG. 6. Each of the springs 244 and 246 will be specified to produce a force (e.g. retention force) sufficient to maintain the hitch hook 230 and the hook foot plate 220 in the closed or engaged position 820 (FIG. 8) and also depicted in FIG. 1C. The particular selection of suitable components for the spring 244, and the second spring 246 in a two-spring configuration, will be based in part on the spring K factor as will be readily within the understanding of one skilled in the art.

Figure 5:
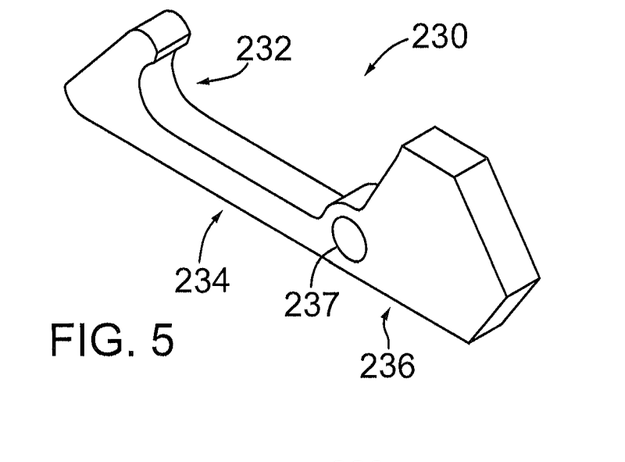
FIG. 5 is an isometric view of the hitch hook member of the fail-safe latch mechanism shown in isolation.

Reference is next made to FIG. 5, which shows the hitch hook 230 according to an embodiment of the present invention. According to an exemplary implementation, the hitch hook 230 is configured as a pintel type hook for engaging a latch ring (e.g. a pintel ring) on another or adjacent cart in order to couple the two carts 110a and 110b together (for example, as described above with reference to FIGS. 1A to 1C). According to an embodiment, the hitch hook 230 is affixed or connected to the hook foot plate 220, for example, welded or bolted from the underside. In this configuration, depressing the hook foot plate 220 moves the hitch hook 230 downwards, i.e. the open or disengaged position 810 as shown in FIG. 8, and described in more detail below.

As shown in FIG. 5, the hitch hook 230 comprises a hook 232, a hook arm 234 and a hook pivot 236. The hook 232 comprises a shape or profile that is configured to securely engage a latch ring (for example, as indicated by reference 122 in FIGS. 1A, 1B and 1C) on another cart for coupling two carts together. The hook arm 234 is configured to provide a clearance or span for engaging (and disengaging) the latch ring to and from the hook 232. The hook pivot 236 is configured to provide a pivot point for moving or swinging the hitch hook 230 between the open 810 and the closed 820 positions, for example, as depicted in FIG. 8. According to an exemplary implementation, the hook pivot 236 includes a hole or bore 237 which allows the hitch hook 230 to be mounted on and supported at the pivot point by the shaft 246, and pivot or swing between the open 810 and closed 820 positions as shown in FIG. 8.

According to an embodiment, the latch mechanism 240 further includes hitch hook side plates 252a and 252b as shown in FIG. 3. The hitch hook side plates 252a, 252b are connected, e.g. welded, to the hitch back plate 210, and are configured to define a recess or channel for the hitch hook 230. The hitch hook side plates 252a, 252b are also configured to provide a stop for the hook foot plate 220, when the hitch hook 230 is in the closed position. As shown in FIGS. 3 and 8, the top surface of hook foot plate 220 abuts or rests against the lower edge or underside of the hitch hook side plates 252a, 252b in the closed or engaged position 820 (and also shown in FIG. 1D). According to another aspect, each of the hitch hook side plates 252a, 252b includes a hitch hook arm indicated by references 253a and 253b, respectively, for instance as depicted in FIGS. 3 and 8. The hitch hook arm 253 is configured to guide the latch or pintel ring 122 (FIG. 1C) into engagement with the hitch hook 230, i.e. the hook 232. The hitch hook arm 253 also facilitates disengaging the latch ring from the hitch hook 230 when the hook foot plate 220 is depressed to the open position 810 (FIG. 8) and the hitch hook 230 pivots downwards. According to another aspect, the hitch hook side plates 252a and 252b each include a hole or bore, indicated by respective references 255a (FIG. 3) and 255b (FIG. 8), for the shaft 246. According to an exemplary implementation, a thrust washer, indicated generally by reference 254 in FIG. 4, is mounted between each hitch hook side plate 252a, 252b and the hitch hook 230. The thrust washer 254 is formed from a softer metal, for example, bronze, and comprises a replacement part that limits the wear which would otherwise occur between the hitch hook side plates 252a, 252b and the hitch hook 230 through the operation of the latch 200.

Reference is made to FIG. 8, which further illustrates operation of the fail-safe latch 200 according to an embodiment of the present invention. The latch mechanism 240 as described above with reference to FIG. 3 holds the hitch hook 230 in the closed or engaged position indicated by reference 820. The closed position 820 is maintained by the force exerted by the spring 244 and/or the spring 245 (e.g. both springs in a two spring configuration). To disengage the hitch hook 230, i.e. move the hitch hook 230 downwards to the open or disengaged position 810, an operator applies a downward force on the hook foot plate 220, e.g. steps down on the plate 220 with his foot. This downward force counteracts the force being exerted by the spring(s) 244, 245, and allows the hitch hook 230 to pivot or swing down to the open or disengaged position 810. Once the operator removes her foot from the hook foot plate 220, the force of the spring(s) 244, 245 pulls the hook foot plate 220 and the hitch hook 230 upwards to the closed or engaged position 820 as shown in FIG. 8 and also in FIGS. 1C, 1D and FIG. 3.

Figure 7:
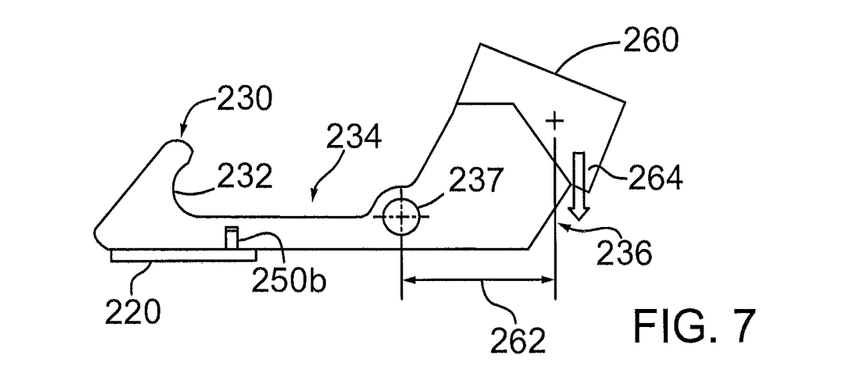
FIG. 7 is a side view of the hitch hook member together with the counter weight.

According to a further embodiment, the latch mechanism is configured with a counterweight indicated generally by reference 260. The counterweight 260 is configured to provide a fail-safe mechanism, and functions to bias and maintain the hitch hook 230 in a closed or engaged position, i.e. engaging the latch ring of an adjoining cart (FIGS. 1A to 1D), should the first spring 244 and/or the second spring 245 fail or experience fatigue to the point that the spring force is insufficient to hold the hitch hook 230 in the closed or engaged position 810 (FIG. 8). According to an exemplary implementation, the counterweight 260 comprises a mass that is affixed or connected to the hook pivot section 236 of the hitch hook 230, as shown in FIGS. 6 and 7. The counterweight 260 is configured to exert a force that is sufficient to keep the hitch hook 230 (and the hook foot plate 220) in the closed position, for example, as indicated by reference 820 in FIG. 8, in the event that the spring(s) 244 and/or 245 fail. It will be appreciated that a moment arm or lever, indicated generally by reference 262 in FIG. 7, is formed between the pivot point of the shaft 246, i.e. the center of the hole 237, and the center of mass of the counterweight 260. Accordingly, the moment arm 262 may be factored into determining an appropriate weight for the counterweight 260, as will be readily within the understanding of one skilled in the art. According to an exemplary implementation, the springs 244 and 245 are configured to exert a force of approximately 35 pounds and the counterweight 260 is configured to exert a force of approximately 5 pounds in the event of spring failure.

In operation, if the spring 244 (or both springs 244 and 245 in a two spring configuration) no longer exerts sufficient force to hold the hook foot plate 220 and the hitch hook 230 in the closed position, for example, as a result of spring fatigue or total spring failure, the counterweight 260 functions to exert a downward force, indicated generally by reference 264 in FIG. 7, that holds or maintains the hook foot plate 220 and the hitch hook 230 in the engaged or closed position (as shown in FIGS. 1C, 1D and FIG. 3, and indicated by reference 820 in FIG. 8). This, in turn, prevents the accidental or inadvertent release or disengagement of the hitch hook 230 from the latch or pintel ring of a coupled cart resulting in a runaway or uncontrolled cart in the plant.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A fail-safe latch for use with an industrial cart, said fail-safe latch comprising:
a housing, and said housing including a back plate configured to be connected to the industrial cart;
a latch mechanism including a shaft and first and second spring positioning plates, said first and second spring positioning plates being attached to said back plate in a spaced arrangement, and further including first and second hitch hook side plates, said first and second hitch hook side plates being attached to said back plate between said first and said second spring positioning plates and configured to form a hitch hook channel, and each of said first and said second spring positioning plates including a spring plate positioning hole, and each of said first and said second hitch hook plates including a hitch hook plate hole, and said spring positioning plate holes being aligned with said hitch hook plate holes to support said shaft disposed there through;
a hitch hook having a hole for receiving said shaft, and said hitch hook being pivotally mounted on said shaft and in said hitch hook channel, and including a hook end configured to engage a latch ring, and a pivot end;
said latch mechanism further including a foot plate, and said foot plate being connected to said hitch hook, and said foot plate including first and second spring retainer;
said latch mechanism further including first and second springs, and said first spring positioning plate including a first spring tab, and said second spring positioning plate including a second spring tab, said first spring being mounted on a section of said shaft between said first spring positioning plate and said first hitch side plate and having one end secured by said first spring tab, and said second spring being mounted on a section of said shaft between said second spring positioning plate and said second hitch side plate and having one end secured by said second spring tab, and said first spring having another end secured by said first spring retainer on said foot plate and said first spring being mounted on said shaft under tension to bias said foot plate and said hitch hook into a latch closed position, and said second spring having another end secured by said second spring retainer on said foot plate and said second spring being mounted on said shaft under tension to bias said foot plate and said hitch hook into said latch closed position; and
a counter weight, and said counter weight being attached to the pivot end of said hitch hook, and configured to generate a force to bias said hitch hook and said foot plate into said latch closed position.

2. The fail-safe latch as claimed in claim 1, wherein said counter weight is attached to said hitch hook in a spaced relationship from said hitch hook hole to form a moment arm so as to increase said bias force.

3. The fail-safe latch as claimed in claim 1, wherein each of said hitch hook plates include a hitch hook arm, said hitch hook arm being configured to facilitate engagement and disengagement of said latch ring on another industrial cart.

4. The fail-safe latch as claimed in claim 3, wherein said housing further comprises first and second side plates and a top plate, said first side plate being attached to one end of said back plate in a spaced relationship from said first spring positioning plate, and said second side plate being attached to the other end of said back plate in a spaced relationship from said second spring positioning plate, and said top plate being attached across the top of said back and said first and said second side plates.

5. An industrial cart in combination with a fail-safe latch as claimed in claim 1.

6. A industrial cart comprising:
a frame;
a carrier coupled to said frame and configured to carry a load;
a plurality of wheels operatively coupled to said frame;
said frame including a mounting plate; and
a fail-safe latch comprising,
a housing, and said housing including a back plate configured to be connected to said mounting plate;
a latch mechanism including a shaft and first and second spring positioning plates, said first and second spring positioning plates being attached to said back plate in a spaced arrangement, and further including first and second hitch hook side plates, said first and second hitch hook side plates being attached to said back plate between said first and said second spring positioning plates and configured to form a hitch hook channel, and each of said first and said second spring positioning plates including a spring plate positioning hole, and each of said first and said second hitch hook plates including a hitch hook plate hole, and said spring positioning plate holes being aligned with said hitch hook plate holes to support said shaft disposed there through;

a hitch hook having a hole for receiving said shaft, and said hitch hook being pivotally mounted on said shaft and in said hitch hook channel, and including a hook end configured to engage a latch ring on another industrial cart, and a pivot end;

said latch mechanism further including a foot plate, and said foot plate being connected to said hitch hook, and said foot plate including first and second spring retainer;

said latch mechanism further including first and second springs, and said first spring positioning plate including a first spring tab, and said second spring positioning plate including a second spring tab, said first spring being mounted on a section of said shaft between said first spring positioning plate and said first hitch side plate and having one end secured by said first spring tab, and said second spring being mounted on a section of said shaft between said second spring positioning plate and said second hitch side plate and having one end secured by said second spring tab, and said first spring having another end secured by said first spring retainer on said foot plate and said first spring being mounted on said shaft under tension to bias said foot plate and said hitch hook into a latch closed position, and said second spring having another end secured by said second spring retainer on said foot plate and said second spring being mounted on said shaft under tension to bias said foot plate and said hitch hook into said latch closed position; and a counter weight, and said counter weight being attached to the pivot end of said hitch hook, and configured to generate a force to bias said hitch hook and said foot plate into said latch closed position.

7. The cart as claimed in claim 6, wherein said hitch hook comprises a hook end, and a pivot end configured to allow said hook end to move between said closed position and said open position, and said fail-safe mechanism comprising a counterweight connected to the pivot end of said hitch hook and configured to swing said hitch hook to said closed position.

8. The cart as claimed in claim 7, wherein said latch mechanism comprises an actuator connected to said hitch hook and being configured to be responsive to an applied force to move said hitch hook to said open position, and further comprising a spring operatively coupled to said actuator and configured to bias said actuator and said hitch hook to said closed position.

* * * * *